(12) United States Patent
Quine et al.

(10) Patent No.: US 11,495,810 B1
(45) Date of Patent: Nov. 8, 2022

(54) POWER MANAGEMENT SYSTEM AND METHOD OF OPERATING THE SAME

(71) Applicant: HRL LABORATORIES, LLC, Malibu, CA (US)

(72) Inventors: Cullen M. Quine, Malibu, CA (US); John J. Vajo, West Hills, CA (US); Jason A. Graetz, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/075,451

(22) Filed: Oct. 20, 2020

Related U.S. Application Data

(62) Division of application No. 15/440,534, filed on Feb. 23, 2017, now Pat. No. 10,892,505.

(Continued)

(51) Int. Cl.
*H01M 8/04992* (2016.01)
*H01M 8/04007* (2016.01)
*H01M 8/0606* (2016.01)
*H01M 8/04858* (2016.01)
*H01M 8/04537* (2016.01)

(Continued)

(52) U.S. Cl.
CPC ... *H01M 8/04992* (2013.01); *H01M 8/04037* (2013.01); *H01M 8/0438* (2013.01); *H01M 8/04201* (2013.01); *H01M 8/04231* (2013.01); *H01M 8/04373* (2013.01); *H01M 8/04567* (2013.01); *H01M 8/04597* (2013.01); *H01M 8/04708* (2013.01); *H01M 8/04947* (2013.01); *H01M 8/0606* (2013.01)

(58) Field of Classification Search
CPC . Y02E 60/50; Y02E 60/36; B01J 7/02; C01B 3/065; C01B 3/0005; C01B 3/04; C01B 2203/066; C01B 2203/085; C01B 3/02; H01M 8/04216; H01M 8/065
See application file for complete search history.

(56) References Cited

U.S. PATENT DOCUMENTS 3,850,696 A  11/1974 Summers et al.
5,702,491 A  12/1997 Long et al.
(Continued)

FOREIGN PATENT DOCUMENTS

KR  10-1306584 B1 * 9/2013 ............ F17C 11/005

*Primary Examiner* — Imran Akram
(74) *Attorney, Agent, or Firm* — Lewis Roca Rothgerber Christie LLP

(57) ABSTRACT

According to an embodiment of the present disclosure, a power management system (e.g., a power management for a fuel cell or a fuel cell system) includes a fuel cell to generate an electrical power output; a metastable hydrogen carrier to supply hydrogen to the fuel cell; a heater coupled with the metastable hydrogen carrier; and a controller coupled to the heater to control a rate of hydrogen release from the metastable hydrogen carrier. A method of operating a fuel cell system includes controlling an electrical power input to a heater utilizing a controller; heating a metastable hydrogen carrier to a temperature by the heater and to generate hydrogen to feed a fuel cell. The heater is coupled to the controller, and the controller controls the electrical power input to the heater according to a relationship between a rate of hydrogen release and the temperature and a composition of the metastable hydrogen carrier.

4 Claims, 11 Drawing Sheets

Related U.S. Application Data

(60) Provisional application No. 62/380,272, filed on Aug. 26, 2016.

(51) Int. Cl.
    *H01M 8/04701*   (2016.01)
    *H01M 8/04082*   (2016.01)
    *H01M 8/04223*   (2016.01)
    *H01M 8/0438*    (2016.01)
    *H01M 8/0432*    (2016.01)

(56) References Cited

U.S. PATENT DOCUMENTS

| | | |
|---|---|---|
| 7,362,073 B2 | 4/2008 | Lecky |
| 9,034,531 B2 | 5/2015 | Fabian et al. |
| 10,297,848 B1 | 5/2019 | Graetz et al. |
| 2002/0025462 A1 | 2/2002 | Nakanishi et al. |
| 2003/0192779 A1 | 10/2003 | Cheng |
| 2008/0025880 A1 | 1/2008 | Shurtleff et al. |
| 2008/0256858 A1 | 10/2008 | Fuller et al. |
| 2009/0035624 A1 | 2/2009 | Kobayashi |
| 2009/0081498 A1 | 3/2009 | Kim et al. |
| 2009/0155648 A1 | 6/2009 | Lee et al. |
| 2011/0243836 A1* | 10/2011 | Curello ............... H01M 8/065 422/292 |
| 2012/0282166 A1 | 11/2012 | Wallace et al. |
| 2012/0282535 A1* | 11/2012 | Fabian ............... H01M 8/065 429/429 |
| 2013/0078544 A1 | 3/2013 | Braithwaite et al. |
| 2013/0196243 A1 | 8/2013 | Braithwaite et al. |
| 2014/0207387 A1* | 7/2014 | Cho ...................... G16C 20/10 702/22 |
| 2015/0217267 A1 | 8/2015 | Barton |
| 2015/0338260 A1 | 11/2015 | Stimits |

\* cited by examiner

POWER MANAGEMENT SYSTEM AND METHOD OF OPERATING THE SAME

CROSS-REFERENCE TO RELATED PATENT APPLICATION

This application is a divisional of U.S. patent application Ser. No. 15/440,534 filed Feb. 23, 2017, now U.S. Pat. No. 10,892,505, which claims priority to and the benefit of U.S. Provisional Patent Application No. 62/380,272, filed in the United States Patent and Trademark Office on Aug. 26, 2016, the entire content of each of which is incorporated herein by reference.

This application is also related to and incorporates by reference in its entirety, as if set forth in full, U.S. patent application Ser. No. 15/440,370, filed Feb. 23, 2017, now U.S. Pat. No. 10,297,848.

FIELD

The following description relates generally to power management systems and method of operating the same.

BACKGROUND

The possibility of utilizing hydrogen as a reliable energy carrier for both stationary and mobile applications has gained renewed interest in recent years due to improvements in low temperature fuel cells and a reduction in hydrogen production costs. There are a variety of ways to store hydrogen, and the more conventional methods include compressed gas (typically at a pressure of 350 or 700 bar) and liquefaction, where the hydrogen is cooled to below its boiling point (20 K). However, these options are costly and require extremely high pressures or low temperatures to achieve reasonable hydrogen densities.

Metastable hydrides can offer high volumetric and gravimetric hydrogen densities and rapid hydrogen release rates at low temperatures. Unlike other kind of metal hydrides, such as reversible metal hydrides, metastable hydrogen carriers rely on kinetic barriers to limit or prevent the release of hydrogen and therefore can be prepared in a stabilized state far from equilibrium. The rapid; low temperature hydrogen evolution rates that can be achieved with these materials offer much promise for fuel cell such as mobile proton exchange membrane (PEM) fuel cell applications. Applications for power from PEM fuel cells may include soldier power, unmanned aerial vehicles (UAV), unmanned underwater vehicles, fuel cell vehicles, or electronics.

One of the challenges with a kinetically stabilized hydrogen carrier, such as the metastable hydride, is controlling the release of hydrogen to match the demand from the fuel cell or other energy conversion device. Left unchecked, the hydrogen pressure can become too high, requiring venting to the environment, or fall too low; starving the fuel cell or energy conversion devices.

Further; there is a demand for making compact lightweight fuel cell systems for applications such as UAVs.

SUMMARY

An aspect according to one or more embodiments of the present invention is directed toward a fuel cell system utilizing a metastable hydrogen carrier as the fuel.

Another aspect according to one or more embodiments of the present invention is directed toward a method of operating the fuel cell system.

Additional aspects will be set forth in part in the description which follows, and, in part, will be apparent from the description, or may be learned by practice of the presented embodiments.

According to an embodiment of the present disclosure, a power control system includes: a metastable hydrogen carrier to supply hydrogen to a fuel cell; a heater coupled with the metastable hydrogen carrier; and a controller coupled to the heater. The controller operates the heater to control a rate of hydrogen release from the metastable hydrogen carrier.

The controller may be configured to increase or decrease a temperature of the metastable hydrogen carrier to respectively increase or decrease the rate of hydrogen release from the metastable hydrogen carrier.

The power control system may further include the fuel cell to generate an electrical power output.

The controller may be to control a distribution of the electrical power output of the fuel cell to the heater and an electrical device.

The power control system may further include a DC/DC converter to convert the electrical power output supplied to the electrical device and/or the heater.

The power control system may further include a purge valve coupled to both the fuel cell and the controller.

The power control system may further include a sensor coupled to the fuel cell and the controller and to provide a signal to the controller, wherein the controller is to control the purge valve according to the signal from the sensor.

The power control system may further include a temperature sensor coupled to the heater and the controller.

The rate of hydrogen release is controlled through temperature of the heater. The temperature is adjusted dynamically or is adjusted according to a set temperature profile.

The rate of hydrogen release is further controlled by at least one of hydrogen pressure, hydrogen flow rate, fuel cell voltage, and power demanded from an electrical device powered by the fuel cell.

The power control system may further include a canister containing the metastable hydrogen carrier, wherein a maximum weight of hydrogen carried by the metastable hydrogen carrier is at least 5 wt % based on a total weight of the heater, the canister and the metastable hydrogen carrier.

The weight of hydrogen carried by the metastable hydrogen carrier may be at least 7 wt % based on a total weight of the heater, the canister and the metastable hydrogen carrier.

The metastable hydrogen carrier may be selected from the group consisting of destabilized multiple-phase hydride systems, saturated hydrocarbons, kinetically limited equilibrium hydrides, $AlH_3$, $LiAlH_4$, $Li_3AlH_6$, $Mg(AlH_4)_2$, $Ca(AlH_4)_2$, hydrides of Ti—Al alloys and combinations thereof.

The controller may be powered by the electrical power output of the fuel cell.

The controller and/or the heater may be powered by an alternative power source other than the fuel cell.

The power control system may further include a power sensor coupled to the heater to generate a feedback loop to control a power supplied to the heater.

The power sensor may be a current sensor and/or a voltage sensor.

The power control system may further include a logging device to store or transmit data to another device containing information about operating conditions of the system.

According to an embodiment, a method of operating a fuel cell system includes: controlling an electrical power input to a heater utilizing a controller; heating a metastable hydrogen carrier to a temperature by the heater and to generate hydrogen to feed a fuel cell; the heater being coupled to the controller, and the controller controlling the electrical power input to the heater according to a relationship between a rate of hydrogen release and the temperature and a composition of the metastable hydrogen carrier.

The relationship between the rate of hydrogen release and the temperature and the composition of the metastable hydrogen carrier may be determined by an equation, the equation including one or more constants independent of temperature and one or more parameters dependent on temperature. The temperature dependent parameters may be dependent on temperature in an Arrhenius form.

The relationship between the rate of hydrogen release and the temperature and the composition of the metastable hydrogen carrier may be determined by a look-up table. The look-up table may include a plurality of rows or columns of data, each row or column lists a rate of hydrogen release and corresponding temperature and composition. The relationship may further include a pressure of the generated hydrogen.

BRIEF DESCRIPTION OF THE DRAWINGS

These and other features and advantages of the present invention will be better understood by reference to the following detailed description when considered in conjunction with the accompanying drawings. It is understood that selected structures and features have not been shown in certain drawings so as to provide better viewing of the remaining structures and features.

DETAILED DESCRIPTION

Figure 1:
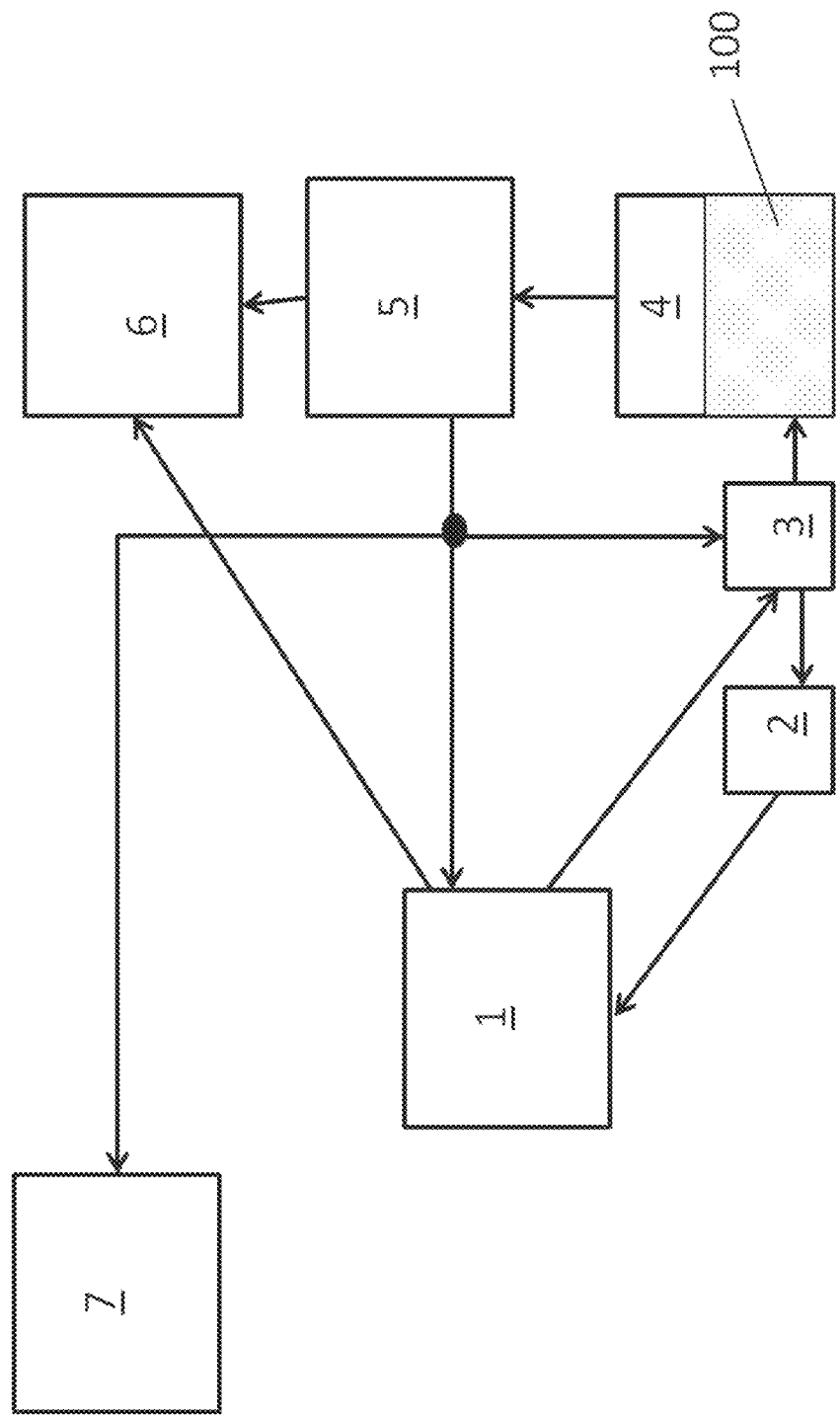
FIG. 1 is a diagram illustrating a power management system (e.g., a power management for a fuel cell or a fuel cell system) according to one embodiment of the present disclosure.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention."

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Metastable hydrogen carriers (also referred to as metastable hydrides, or hydrogen carriers under metastable conditions) are hydrogen carriers characterized by equilibrium hydrogen pressures that are higher than the pressures at which hydrogen is actually released. Equivalently, the temperatures required for practical rates of hydrogen release are higher than the equilibrium temperatures required for a chosen release pressure. For these materials, hydrogen release is mainly controlled by temperature and not by the equilibrium hydrogen pressure. Thus the equilibrium pressure over the range of temperatures at which hydrogen is being released is higher than the delivery pressure for the device utilizing the hydrogen. For fuel cells, this delivery pressure is typically about 1 bar (100 kPa) to about 5 bar. These materials are referred to as metastable because thermodynamically when the equilibrium hydrogen pressure is higher than the pressure at which hydrogen is released, the release of hydrogen has a negative free energy change (delta-G less than 0 kJ/mol). Therefore, there is a thermodynamic driving force for the release of hydrogen (hydrogen evolution). However, the release of hydrogen is typically being restrained ("held-back") to some extent by the kinetics (e.g., temperature, composition, etc.). Many metastable hydrogen carriers are characterized by low desorption enthalpies and very high equilibrium pressures (e.g., greater than 100 kPa).

Metastable hydrides may include metal hydrides, destabilized multiple-phase hydride systems, saturated hydrocarbons, kinetically limited equilibrium hydrides, etc. Metastable hydride materials require less heat to release the hydrogen at practical pressures (e.g., ambient pressure) and often exhibit rapid $H_2$ evolution rates (rate of hydrogen release) at low temperatures (e.g., about 80° C. to about 100° C.), due to the large driving force for decomposition (i.e., to release hydrogen). Metastable hydrides may also include additives such as catalysts that modify (improve) the kinetics while still retaining kinetic barriers that characterize the metastable behavior.

Examples of metastable metal hydrides include aluminum hydride ($AlH_3$), lithium aluminum hydride ($LiAlH_4$ and $Li_3AlH_6$), magnesium aluminum hydride ($Mg(AlH_4)_2$), calcium aluminum hydride ($Ca(AlH_4)_2$), and hydrides of Ti—Al alloys. Examples of destabilized (or reactive composite) multiple-phase hydride systems include $LiBH_4/MgH_2$, $MgH_2/Si$, $LiBH_4/Al$, $LiBH_4/MgF_2$, $LiBH_4/Mg_2FeH_6$, $LiBH_4/Mg_2NiH_4$ and LiH/LiOH (which releases hydrogen exothermically). In the multiple-phase hydride systems, the multiple phases that characterized these systems can impose significant kinetic barriers that lead to temperatures for practical rates of hydrogen release that are greater than the equilibrium temperatures for a chosen release pressure. For example, the $LiBH_4/MgH_2$ system includes the hydrogenated phases $LiBH_4$ and $MgH_2$, and the dehydrogenated phases $MgB_2$ and LiH. The hydrogenated phases $LiBH_4$ and $MgH_2$ must interact with each other and be consumed for the release of hydrogen. The dehydrogenated phases $MgB_2$ and LiH must nucleate and grow during hydrogen release. Examples of metastable saturated hydrocarbons include $C_{10}H_{22}$ (decane) and $C_{20}H_{42}$ (icosane).

Metastable kinetically limited equilibrium hydrides are those hydrides that ideally or in some circumstances would be reversible hydrides (which are able to be rehydrogenated under moderate temperature and pressure conditions), yet the kinetic limitations make it behave as a metastable hydride. Reversible hydrides release hydrogen through a thermolysis reaction (temperature stimulated hydrogen release) when the temperature of the hydrogen carrier is raised above the equilibrium temperature for a given hydrogen partial pressure. Conversely, hydrogen uptake occurs when the temperature is lowered below the equilibrium temperature. In this scenario the rate of hydrogen release is naturally controlled by a material maintained at a constant temperature. Examples of metastable kinetically limited equilibrium hydrides include $NaAlH_4$ and $Mg(BH_4)_2$. For example, $NaAlH_4$ hydride has been extensively studied and developed as an equilibrium hydride. However, hydrogen release from $NaAlH_4$ is kinetically limited, and near equilibrium behavior can be achieved only with the addition of catalytic additives and/or nano-scaling. For such a system, the extent to which the kinetic limitations are reduced can be tailored and therefore enabling $NaAlH_4$ to be utilized as a metastable hydride. Similarly, hydrogen release from $Mg(BH_4)_2$ is kinetically limited even with the addition of catalysts or formation of alloys such as $Mg_{0.5}Mn_{0.5}(BH_4)_2$, and may be utilized as a metastable hydride with tailored kinetic limitations.

Table 1 is a comparison of the specific energy (in MJ/Kg) and energy density (in MJ/L) among hydrogen tanks, conventional batteries, and a fuel cell system utilizing $AlH_3$ ($AlH_3$/fuel cell) as the fuel. In the $AlH_3$/fuel cell case, a 50 kW fuel cell operating at 50% conversion efficiency was assumed, with an additional 50% penalty for weight and volume of the tank, fuel cell, and additional hardware, which results in a system with 25% of the material energy density. Even so, as shown in Table 1, a hydrogen fuel cell utilizing a metal hydride (e.g., $AlH_3$) as a $H_2$ source yields gravimetric and volumetric energy densities of about four times that of the best performing lithium batteries.

| Energy Source | Specific Energy (MJ/kg) | Energy Density (MJ/L) |
| --- | --- | --- |
| 700 bar hydrogen tank | 3.1 | 1.6 |
| 350 bar hydrogen tank | 3.3 | 1.1 |
| $AlH_3$/fuel cell | 3.1 | 4.3 |
| Li polymer | 0.72 | 1.1 |
| Ni-Metal hydride | 0.29 | 0.36 |
| Ni-Cd | 0.18 | 0.36 |
| Pb-acid | 0.11 | 0.14 |

Because the energy density of a power source made of a metal hydride and a fuel cell (such as a PEM fuel cell) is substantially larger than even the lithium batteries currently available, the metastable hydrides such as those listed above may be ideally suited for portable power systems where weight and volume are critical.

FIG. 1 is a diagram illustrating a power management system (e.g., a power management for a fuel cell or a fuel cell system) according to one embodiment of the present disclosure. Referring to FIG. 1, the fuel cell system includes a controller (also referred to as a processor unit or control circuit) 1, a temperature sensor 2, a heater 3, a canister 4 for containing the metastable hydrogen carrier 100, a fuel cell 5, a purge unit 6, and an electrical device 7 powered by the fuel cell 5.

In the fuel cell system, the controller 1 controls the temperature of the metastable hydrogen carrier through controlling the heater 3, and thereby controlling the rate of hydrogen release from the metastable carrier. The controller 1 sets the target temperature for the heater to heat the metastable hydrogen carrier according to a desired rate (target rate) of hydrogen release required by the fuel cell 5. The controller 1 determines the target temperature according to the relationship between the rate of hydrogen release and the temperature and composition of the metastable hydrogen carrier. The relationship between the rate and the temperature and the composition may be represented by a function with one or more constants independent of temperature and one or more parameters dependent on temperature. The temperature dependent parameters may be dependent on temperature in any suitable form, such as an Arrhenius form. The relationship may be expressed in the form of an equation or a look-up table. U.S. Pat. No. 10,297,848 B1 discloses examples of relationship between the rate and the temperature and the composition, and is incorporated herein by reference in its entirety.

The relationship between the rate and the temperature and composition may be represented by Equation 1:

$$r = \exp\left(\frac{-E_a}{RT}\right)\left(r_{00} + \frac{A_0}{(x-x_0)^2 + B}\right), \qquad \text{Equation 1}$$

wherein in Equation 1, r is the rate of hydrogen release, T is the temperature of the metastable hydrogen carrier, x is the composition (e.g., the current composition) of the metastable hydrogen carrier, $x_0$ is an initial composition of the metastable hydrogen carrier, R is the gas constant, and $E_a$, $r_{00}$, $A_0$, and B are constants.

In another embodiment, the rate relation may be represented by Equation 2:

$$T = \left[ -\frac{R}{E_a} \ln \left( \frac{r}{r_{00} + \frac{A_0}{(x-x_0)^2 + B}} \right) \right]^{-1}, \quad \text{Equation 2}$$

wherein in Equation 2, r represents the target rate, T represents the required temperature, R is the gas constant, $E_a$, $r_{00}$, $A_0$, and B are constants, $x_0$ is an initial composition and x is the current composition of the metastable hydrogen carrier.

Figure 7:
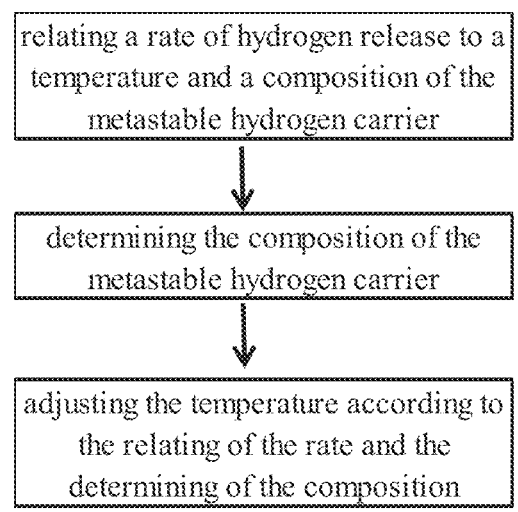
FIG. 7 is a flow chart illustrating a method of controlling a rate of hydrogen release from a decomposition reaction of a hydrogen carrier according to an embodiment of the present disclosure.

FIG. 7 is a flow chart illustrating a method of controlling a rate of hydrogen release (hereinafter, interchangeably used as "the rate") from a decomposition reaction of a hydrogen carrier according to an embodiment of the present disclosure. Referring to FIG. 7, a method of controlling a rate of hydrogen release from a decomposition reaction of a metastable hydrogen carrier includes: relating the rate of hydrogen release to a temperature and a composition of the metastable hydrogen carrier; determining the composition of the metastable hydrogen carrier; and adjusting the temperature according to the relating of the rate and the determining of the composition. The decomposition reaction may be a thermally neutral reaction, an endothermic reaction or an exothermic reaction. The rate of hydrogen release may be a constant rate.

The metastable hydrogen carrier may be in the solid state or liquid state and may be far from reaching the equilibrium state (i.e., the equilibrium hydrogen pressure is much greater than a desired, required, safe and/or reasonable pressure). The rate of hydrogen release of the metastable hydrogen carrier may be described as a function of temperature and composition and kinetically controlled by adjusting the temperature of the metastable hydrogen carrier. The relating of the rate of hydrogen release to the temperature and the composition of the metastable hydrogen carrier may result in a relationship in the form of a rate equation or a look-up table. In the rate equation, the rate of hydrogen release may be expressed as a function of temperature and composition, or the temperature may be expressed as a function of the rate and composition. In the look-up table, the rate of hydrogen release at various temperatures and compositions are listed in a plurality of rows (or columns) and each row (or column) includes one rate of hydrogen release and the corresponding temperature and composition.

The determining of the composition of the metastable hydrogen carrier provides the value of the composition of the metastable hydrogen carrier utilized in the relationship among the rate of hydrogen release, the temperature and the composition, and may be utilized to determine the target temperature for a desired rate of hydrogen release at that composition.

Here, the composition refers to the percent of hydrogen released from the metastable hydrogen carrier based on the total amount of hydrogen in the pure (pristine) hydrogen carrier prior to any decomposition reaction.

For example, hydrogen is 10 weight percent (wt %) in pure $AlH_3$ (pristine $AlH_3$) based on the total weight of $AlH_3$. For a pure $AlH_3$, the composition, representing the percent of hydrogen released, is 0%. When a given amount of hydrogen is released, pure $AlH_3$ turns to be a mixture of Al, $H_2$ and $AlH_3$ with Al and $AlH_3$ remaining in the solid phase and $H_2$ in a separate gas phase. For example, when 1 wt % hydrogen has been released (i.e., 9 wt % hydrogen remains) in a mixture of Al—$AlH_3$, the composition of this metal hydride is calculated by the amount of hydrogen released divided by the total amount of hydrogen in the pure metal hydride. Accordingly, the composition of the $AlH_3$ with 1 wt % (out of 10 wt % total) hydrogen released is determined to be 10%. Similarly, when the hydrogen has been completely decomposed, the solid phase includes only Al, and the composition at this stage is determined to be 100%.

Here, the term "composition" as defined above may also represent the weight of Al metal (not bound to hydrogen) over the total weight of all of the Al in the solid phase. That is, prior to any decomposition (i.e., when no hydrogen has been released from the pure $AlH_3$, also referred to as the pristine $AlH_3$), the composition is 0% (i.e., no free Al that is not bound to hydrogen exists in the system). When hydrogen has been completely released and all Al in the system are in the form of free Al, the composition is 100%.

When controlling the rate of hydrogen release, at an initial time to, the composition of the metastable hydrogen carrier may be $x_0$, and a target rate of hydrogen release may be $r_0$. The required temperature for a rate of $r_0$ when the composition is $x_0$ is then determined according to the rate equation. As the composition of the metastable hydrogen carrier changes as a function of the rate and time, the composition $x_i$ at a time $t_i$ is tracked, and utilized in the rate equation for the calculation of the required temperature corresponding to the rate $r_i$ at time $t_i$.

As hydrogen is being released from the metastable hydrogen carrier, the composition of the metastable hydrogen carrier changes with time. The determining of the composition (e.g., the current composition) of the metastable hydrogen carrier (at the current time in order to determine the target temperature for the current time) may include measuring the composition (e.g., the current composition) of the metastable hydrogen carrier directly. In another embodiment, determining of the composition (e.g., the current composition) of the metastable hydrogen carrier may include tracking the composition of the metastable hydrogen carrier over time. For example, the determining of the composition may include: measuring a hydrogen flow rate (or the hydrogen release rate); integrating the hydrogen flow rate (over time) to determine a cumulative amount of evolved hydrogen; and dividing the cumulative amount of evolved hydrogen by a total amount of stored hydrogen in the metastable hydrogen carrier to determine the composition.

The rate equation may be a function with one or more constants that are independent of temperature and one or more parameters that are dependent on temperature. The parameters that are dependent on temperature may be dependent on temperature in an Arrhenius form, or any other suitable forms.

Figure 8:
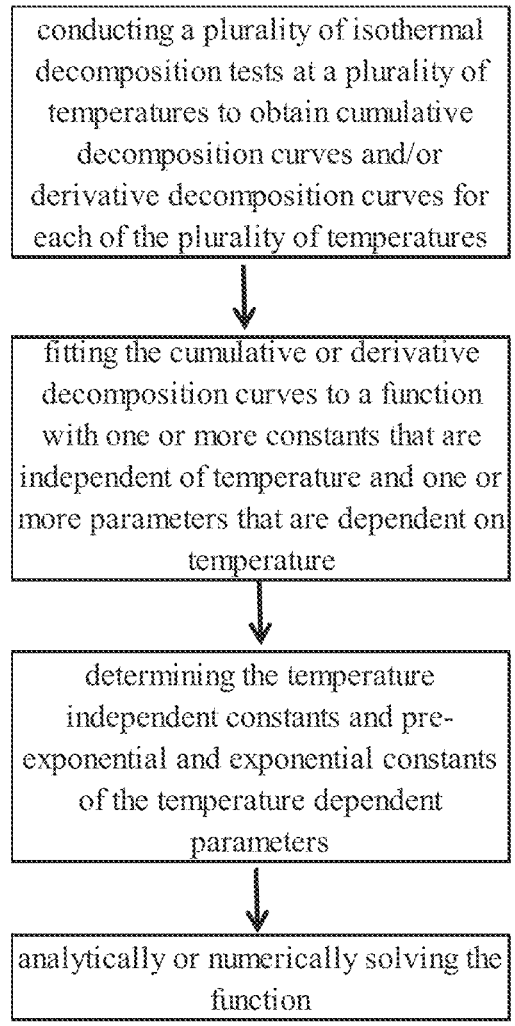
FIG. 8 is a flow chart illustrating a method of determining a rate equation according to an embodiment of the present disclosure.

FIG. 8 is a flow chart illustrating a method of determining a rate equation according to an embodiment of the present disclosure. Referring to FIG. 8, a method for determining a rate equation representing the rate of hydrogen release includes: conducting a plurality of isothermal decomposition reactions at a plurality of temperatures to obtain cumulative decomposition curves and/or derivative decomposition curves for each of the plurality of temperatures; fitting the cumulative or derivative decomposition curves to the function with one or more constants that are independent of temperature and one or more parameters that are dependent on temperature in a suitable form (with pre-exponential and exponential constants); determining the temperature independent constants and pre-exponential and exponential constants of the temperature dependent parameters; and analytically or numerically solving the function. The temperature dependent parameters may be dependent on temperature in an Arrhenius form, or any other suitable forms, which may be explicitly included for the temperature, given a specified composition and decomposition rate. The cumulative decomposition curves plot composition as a function of time and the derivative decomposition curves plot the rate of change in composition as a function of time.

The Arrhenius form may be represented by Equation 3:

$$k(T) = A\,\exp\!\left(\frac{-E_a}{RT}\right) \quad \text{Equation 3}$$

In Equation 3, k represents a parameter that is dependent on temperature, $E_a$ is the activation energy, R is the gas constant, T represents temperature, and A is a constant.

The rate equation may be in the form of Equation 4 where the decomposition rate is expressed as a function of temperature and composition, or in the form of Equation 2, where temperature is expressed as a function of the decomposition rate and composition.

$$r = r_0 + \frac{A}{(x - x_0)^2 + B} \quad \text{Equation 4}$$

$$T = \left[-\frac{R}{E_a}\ln\!\left(\frac{r}{r_{00} + \frac{A_0}{(x - x_0)^2 + B}}\right)\right]^{-1} \quad \text{Equation 2}$$

In Equations 4 and 2, r represents the decomposition rate, T represents temperature, x represents the composition, R is the gas constant, $E_a$ is the activation energy, $r_{00}$, $A_0$, B, and $x_0$ are constants, and $r_0$ and A are temperature dependent parameters that satisfies the following Equations 5 and 6:

$$A(T) = A_0 \exp\!\left(\frac{-E_a}{RT}\right) \quad \text{Equation 5}$$

$$A(T) = A_0 \exp\!\left(\frac{-E_a}{RT}\right) \quad \text{Equation 6}$$

By fitting the cumulative or derivative decomposition curves to the form of Equation 4 or Equation 2, the temperature independent constants (e.g., B, $x_0$) and pre-exponential constants (e.g. $A_0$, $r_{00}$) and exponential constants (e.g., $E_a$) of the temperature dependent parameters (e.g., $r_0$ and A) are determined. Equation 4 and/or Equation 2 is thereby solved and may be utilized for the prediction or control of the decomposition reaction. By determining the composition of the metastable hydrogen carrier, any rate of hydrogen release may be achieved at any point during decomposition with the application of the rate equation.

In one embodiment, hydrogen is released by heating the metastable hydrogen carrier to a target temperature, without the inclusion of (absent of) other chemical reagents to react with the metastable hydrogen carrier in order to release hydrogen from the metastable hydrogen carrier.

Figure 9:
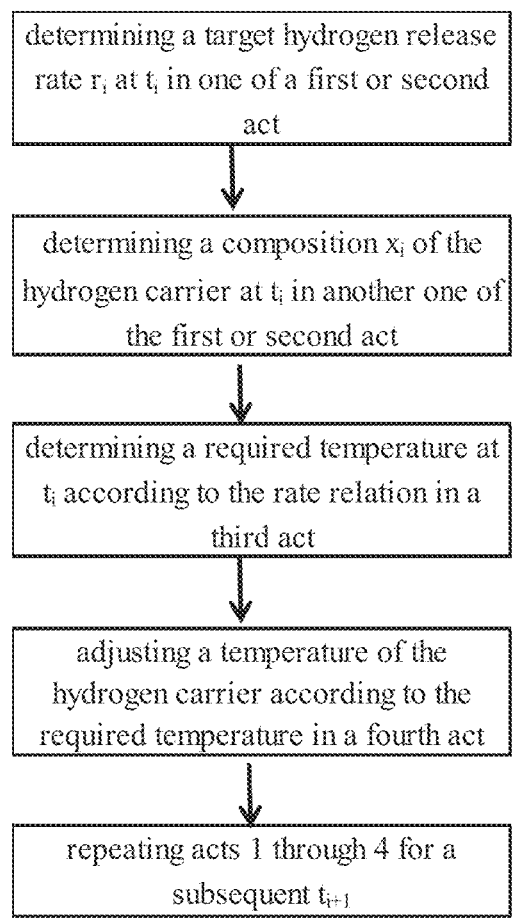
FIG. 9 is a flow chart illustrating a method of controlling a rate of hydrogen release from a decomposition reaction of a hydrogen carrier according to an embodiment of the present disclosure.

FIG. 9 is a flow chart illustrating a method of controlling a rate of hydrogen release from a decomposition reaction of a metastable hydrogen carrier according to an embodiment of the present disclosure. Referring to FIG. 9, a method for thermally controlling the rate of hydrogen release from a metastable hydrogen carrier according to a rate relation includes: determining a target rate of hydrogen release $r_i$ at $t_i$ in one of a first or second act, t representing time and i being an integer, determining a composition $x_i$ of the metastable hydrogen carrier at $t_i$ in another one of the first or second act; determining a required temperature at $t_i$ according to the rate relation in a third act; adjusting a temperature of the metastable hydrogen carrier according to the required temperature in a fourth act; and repeating acts 1 through 4 for a subsequent $t_{i+1}$. The rate relation determines the required temperature according to the target rate of hydrogen release and the composition of the metastable hydrogen carrier. Here, the difference between $t_i$ and $t_{i+1}$ may be a constant value, for example, 0.1 seconds, 1 second, 1 minute, etc., or may be infinitesimal, i.e., the composition of the metastable hydrogen carrier is continuously determined (calculated and/or measured) and the rate of hydrogen release may be continuously adjusted to provide the profile of the target rate of hydrogen release.

The profile of the target rate of hydrogen release may be a constant rate over time, or may be a variable of time. The determining of the target rate of hydrogen release may include determining a desired load of a power system, where the power system utilizes the hydrogen from the metastable hydrogen carrier as a fuel. For example, the determining of the desired load of the power system may include measuring the current draw of a fuel cell.

In repeating acts 1 through 4 for a subsequent $t_{i+1}$, the target rate of hydrogen release $r_{i+1}$ at $t_{i+1}$ is determined; the composition $x_{i+1}$ of the metastable hydrogen carrier at $t_{i+1}$ is also determined. Then, the required temperature at $t_{i+1}$ according to the rate relation is determined followed by the adjustment of the temperature of the metastable hydrogen carrier. Here, the determining of the composition $x_{i+1}$ of the metastable hydrogen carrier at $t_{i+1}$ may include: calculating a product of the hydrogen flow rate $r_i$ and ($t_{i+1}$-$t_i$); and adding the product and $x_i$ to obtain $x_{i+1}$. However, embodiments of the present disclosure are not limited thereto and the composition of the metastable hydrogen carrier may be obtained through any suitable methods.

The rate relation may be expressed in the form of a rate equation (rate-temperature-composition equation), such as Equation 2 or 4 disclosed above, or a look-up table.

Figure 10:
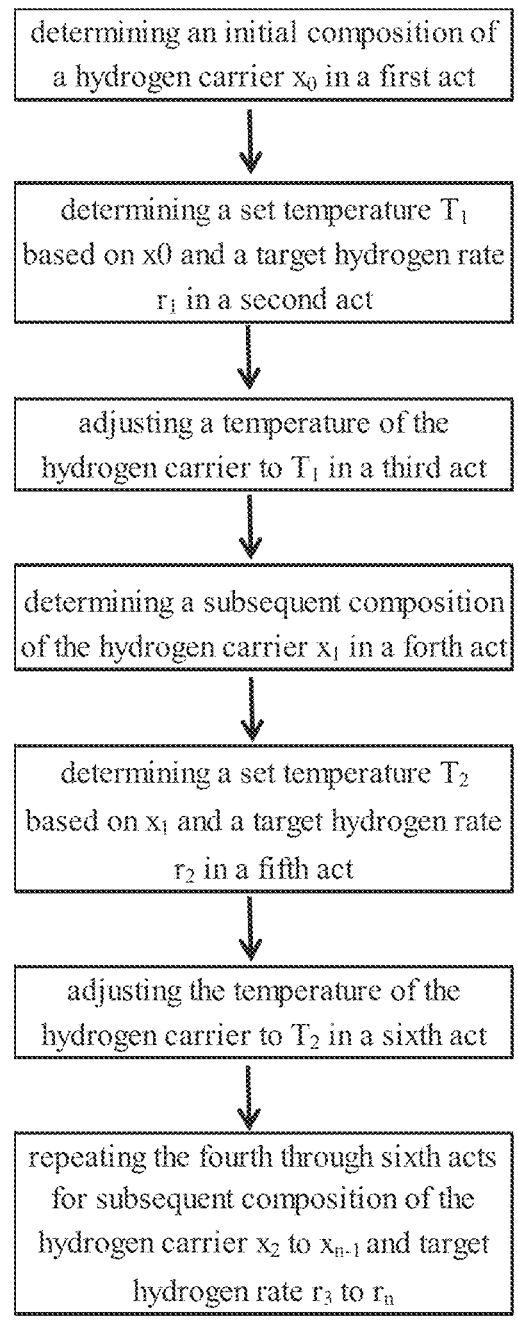
FIG. 10 is a flow chart illustrating a method of controlling a rate of hydrogen release from a decomposition reaction of a hydrogen carrier according to an embodiment of the present disclosure.

Sometimes, the initial composition of the metastable hydrogen carrier may not be zero. That is, the metastable hydrogen carrier may have gone through partial decomposition before the beginning of the rate control. FIG. 10 is a flow chart illustrating a method of controlling a rate of hydrogen release from a decomposition reaction of a metastable hydrogen carrier whose initial composition is not 0% according to an embodiment of the present disclosure. Referring to FIG. 10, a method for thermally controlling the rate of hydrogen release from a metastable hydrogen carrier according to a rate equation includes: determining an initial composition $x_0$ of a hydrogen carrier in a first act; determining a set temperature $T_1$ based on $x_0$ and a target hydrogen rate $r_1$ in a second act; adjusting a temperature of the metastable hydrogen carrier to $T_1$ in a third act; determining a subsequent composition of the metastable hydrogen carrier $x_1$ in a forth act; determining a set temperature $T_2$ based on $x_1$ and a target hydrogen rate $r_2$ in a fifth act; adjusting the temperature of the metastable hydrogen carrier to $T_2$ in a sixth act; and repeating the fourth through sixth acts for subsequent composition of the metastable hydrogen carrier $x_2$ to $x_{i-1}$ and target hydrogen rate $r_3$ to $r_n$. Here, n represents an integer.

The initial composition of the metastable hydrogen carrier may be determined utilizing any suitable method. For example, one method may include applying a temperature profile (ramp or constant) to the metastable hydrogen carrier (e.g., a hydride bed), measuring the rate of hydrogen release, and determining the composition from the rate-temperature-composition equation or a look-up table. This process could occur during the metastable hydrogen carrier (e.g., hydride bed) warm up period. Given the limited supply of hydrogen, it is desirable that the initial composition measurement consumes as little hydrogen as possible.

Figure 11:
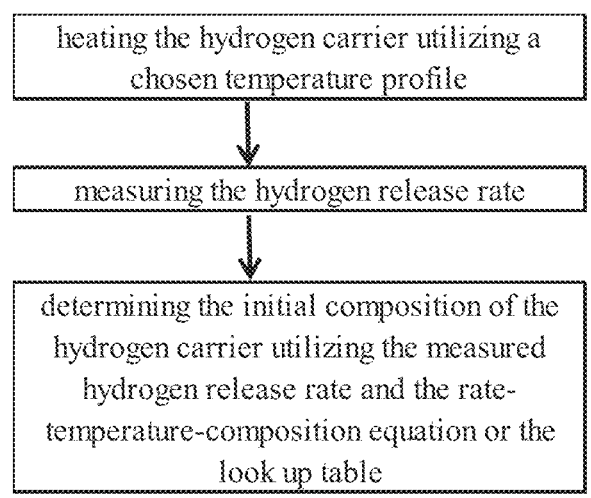
FIG. 11 is a flow chart illustrating a method of determining the initial composition of a hydrogen carrier according to an embodiment of the present disclosure.

FIG. 11 is a flow chart illustrating a method of determining the initial composition of a metastable hydrogen carrier according to an embodiment of the present disclosure. Referring to FIG. 11, the method includes: heating the metastable hydrogen carrier utilizing a chosen temperature profile; measuring the rate of hydrogen release; determining the initial composition of the metastable hydrogen carrier utilizing the measured rate of hydrogen release and the rate-temperature-composition equation or the look-up table.

In one embodiment, the method may further include determining the rate relation. The determining of the rate relation may include measuring a plurality of rates of hydrogen release at a plurality of isothermal desorption temperatures; and determining the constants of Equation 2 or building a look-up table according to the plurality of rates of hydrogen release and the plurality of isothermal desorption temperatures. The isothermal desorption measurements for establishing the rate-temperature-composition equation may be conducted once for a batch of materials, rather than conducted for each device that utilizes fuels from the same batch of materials.

The chosen temperature profile may be any suitable temperature profile, such as a constant temperature step or steps, a linear ramp such as with a constant heating rate, a non-linear ramp such as with varying heating rate, a sine wave, or a combination thereof. In one embodiment, two or more of the above described temperature profiles may be sequentially combined. For example, a linear ramp at a constant heating rate may be followed by a constant temperature step.

The measuring of the rate of hydrogen release is conducted during the heating of the metastable hydrogen carrier. The rate may be measured directly (e.g., through a flow meter) or indirectly (e.g., through the measurement of cumulative pressure, and then calculate the rate through differentiation of the cumulative pressure).

The rate of hydrogen release versus the composition may be a "bell-shaped" (Lorentzian) curve, where a given rate may correspond to two possible compositions (e.g., one prior to the peak position of the bell-shaped curve and another after the peak position). If prior knowledge of the state of the metastable hydrogen carrier is available (e.g., knowledge that the tank is more or less than half full, or knowledge that the composition of the metastable hydrogen carrier is greater or less than 50%), then only one temperature-rate measurement is needed to determine the composition. If no knowledge of the state of composition exits, then two rate measurements are needed to determine if the rate is increasing or decreasing, and selecting the composition on the respective side of the curve.

The composition may also be measured by a direct method.

According to an embodiment of the present disclosure, a method of determining a rate relation of hydrogen release from a metastable hydrogen carrier according to a temperature and time includes: conducting a plurality of isothermal decomposition reactions at a plurality of temperatures to obtain data on composition as a function of time for each of the plurality of temperatures; determining respective values for n, k and to in Equation 7 according to the data for each of the plurality of temperatures;

$$\alpha(t)=1-\exp(-k^n(t+t_0)^n) \quad \text{Equation 7}$$

wherein in Equation 7, t represents time, x(t) represents the composition as a function of t (time), n is a constant, k is a rate constant determined by Equation 8, $t_0$ is a function of an initial composition of the metastable hydrogen carrier and determined by Equation 9, $$k(T) = k_0 \exp\left(\frac{-E_a}{RT}\right) \quad \text{Equation 8}$$

$$t_0(T) = t_{00} \exp\left(\frac{-E_a}{RT}\right) \quad \text{Equation 9}$$

wherein in Equations 8 and 9, R is the gas constant, $E_a$, $k_0$ and $t_{00}$ are constants;

determining values for $E_a$, $k_0$ and $t_{00}$ from the values for n, k and $t_0$ for the plurality of temperatures; and determining the rate of hydrogen release at a given temperature and time according to Equation 10

$$r = nk_0^n \exp\left(\frac{-nE_a}{RT}\right)\left(t + t_{00}\exp\left(\frac{-E_a}{RT}\right)\right)^{n-1} \quad \text{Equation 10}$$
$$\exp\left[-k_0^n \exp\left(\frac{-nE_a}{RT}\right)\left(t + t_{00}\exp\left(\frac{-E_a}{RT}\right)\right)^n\right].$$

The controller 1 may include a microprocessor, a field-programmable gate array (FPGA) or any suitable device for processing inputs from the temperature sensor 2 and other devices of the system and controlling the heater 3, the purge unit 6 and other devices of the system. For example, an 8-bit ATMEGA328P and an ARM 32-bit Cortex-M0 processor may be utilized (and utilized interchangeably). The target temperature for the heater (as an output command of the controller) may be updated (determined) at a predetermined or set frequency, for example, at every second. Here, the target temperature for the heater (and the temperature of the metastable hydrogen carrier) may be updated dynamically, for example, the target temperature may be constantly adjusted to respond to a variable power demand on the fuel cell (a power demand that changes with time). In another embodiment, the target temperature is adjusted according to a set or predetermined temperature profile to support an electrical load with a known power demand. The temperature profile may include one or more of a constant rate ramp, an isothermal segment, and a variable rate ramp.

The bandwidth of the feedback control of the controller may be approximately estimated based on the lag time in heating the metastable hydride to the target temperature. Other devices that may be coupled to the controller 1 may include, for example, pressure gauges, flow meters, voltage sensors, Coulomb counters, and/or current integrators.

In one embodiment, the controller 1 may also control the distribution of the power generated by the fuel cell 5 among the electrical device 7, the heater 3, and other devices of the system. The controller 1 is the main controller of the device, although this unit does not necessarily have to include only one single component.

The controller 1 and/or any other relevant devices or components according to embodiments of the present invention described herein may be implemented utilizing any suitable hardware, firmware (e.g. an application-specific integrated circuit), software, or a combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on one substrate. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device utilizing a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The temperature sensor 2 senses the temperature of the metastable hydrogen carrier 100, the canister 4, and/or the temperature of the heater 3. The temperature sensor 2 is further coupled to the controller 1 to provide the temperature information to the controller 1.

For example, the temperature sensor 2 may be a K-type thermocouple. The thermocouple voltage may be connected to an amplification circuit, which linearizes temperature as a function of the voltage. The controller 1 reads this voltage periodically or continuously utilizing, for example, an analog to digital converter, and utilizes a linear equation to determine the value of the temperature. The value of temperature is then utilized as an input into a Proportional Integral Derivative (PID) feedback loop or any other suitable feedback mechanism controlled by the controller 1 and with a duty cycle (the cyclic sequence of the heater and/or the fuel cell) as an output to the heater 3. Here, specific temperature sensors and control mechanism are described as example embodiments. However, embodiments of the present disclosure are not limited thereto and various suitable temperature sensors and control mechanisms may be utilized to detect the value of the temperature, providing this value to the controller 1, and generating an output to control the heater 3.

The heater 3 may be any suitable kind of heater as long as it can quickly and uniformly heat the metastable hydrogen carrier to the target temperature set by the controller. In one embodiment, the heater 3 includes heating elements evenly distributed within and integrated with the canister 4. For example, a spiral coiled heater may be integrated inside a cylindrical canister to provide uniform heating to the metastable hydrogen carrier contained inside the canister. Other methods of heating, such as heating from the outside of the canister or heating within the walls of the canister, etc., may also be utilized.

The canister 4 may be made of any suitable material as long as it satisfies the following conditions: the material is able to tolerate the working temperature and the pressure of the device; at least the internal surface of the canister is chemically inert to the metastable hydrogen carrier, the products or hydrogen, and is not permeable to hydrogen. Suitable materials for making the canister include metals, ceramics, carbon fiber, etc. For example, the canister may be made of aluminum. The canister may be in any suitable size and shape. The canister may be made of an insulating material. The canister may be further insulated with fiberglass, an aerogel, or other thermal insulators. The canister may have an outlet (e.g., a tube connection) for hydrogen gas to flow to the fuel cell. However, other methods of hydrogen transportation, including but not limited to a semi-permeable membrane, may also be utilized.

The fuel cell 5 receives the hydrogen from the canister 4 and utilizes it as a fuel for generating electrical power. There is no particular limitation on the kind of fuel cell as long as it utilizes hydrogen as a fuel. The fuel cell 5 may include an anode, a cathode and an electrolyte sandwiched between the anode and the cathode. The hydrogen may enter the fuel cell 5 at the anode, and oxygen may enter the fuel cell at the cathode. The electrical power generated is then distributed among the heater 3, the electrical device 7 and/or other devices in the system, the distribution of which is controlled by the controller 1.

The purge unit 6 includes a purge valve that is controlled by the controller 1. When the purge valve opens, excess water as well as other contaminants accumulated inside the fuel cell 5 is discharged to the outside of the fuel cell. The purge valve may be powered either directly by the fuel cell 5, or by an external power source.

The control signal from the controller 1 to the purge unit 6 may be in any suitable form, such as a logic signal to a metal-oxide-semiconductor field-effect transistor (MOSFET), which controls the power to the purge valve. The purge valve opens if power is supplied to it and closes otherwise. In one embodiment, the purge duration and period may be dynamically optimized (determined) based on fuel cell performance characteristics, such as the fuel cell voltage, current, and previous power production history (e.g., amp-hour (Ah) throughput) of the fuel cell. This allows for a dynamic purge, which is directly related to and determined by the current state of the fuel cell.

The electrical device 7 is a device that is powered by the fuel cell 5. Example devices include soldier power, unmanned aerial vehicles (UAV), un-manned underwater vehicles along with fuel cell vehicles, but embodiments of the present disclosure are not limited thereto and the electrical device (electrical load) may be any suitable device that is powered electrically.

The metastable hydrogen carrier 100 may be any suitable compounds that have a low desorption enthalpy and a very high equilibrium pressure. The canister 4, the metastable hydrogen carrier 100 (e.g., a metastable metal hydride), together with the heater 3 integrated with the canister 4 and/or the metastable hydrogen carrier 100 is referred to as the hydrogen generator assembly. In its fully charged state (prior to any decomposition), the amount of hydrogen contained in this assembly may be represented by the specific hydrogen density, which is the number of grams of hydrogen per 100 grams of the weight of the assembly and expressed as the weight percent hydrogen (wt %). In one embodiment, the weight percent hydrogen in the hydrogen generator assembly is 5 wt % or more, for example, 6 wt % or more, 7 wt % or more, 8 wt % or more, or 9 wt % or more. When the weight percent hydrogen is within the above ranges, the fuel cell system has desired energy density, efficient space utilization and long operation time.

Figure 2:
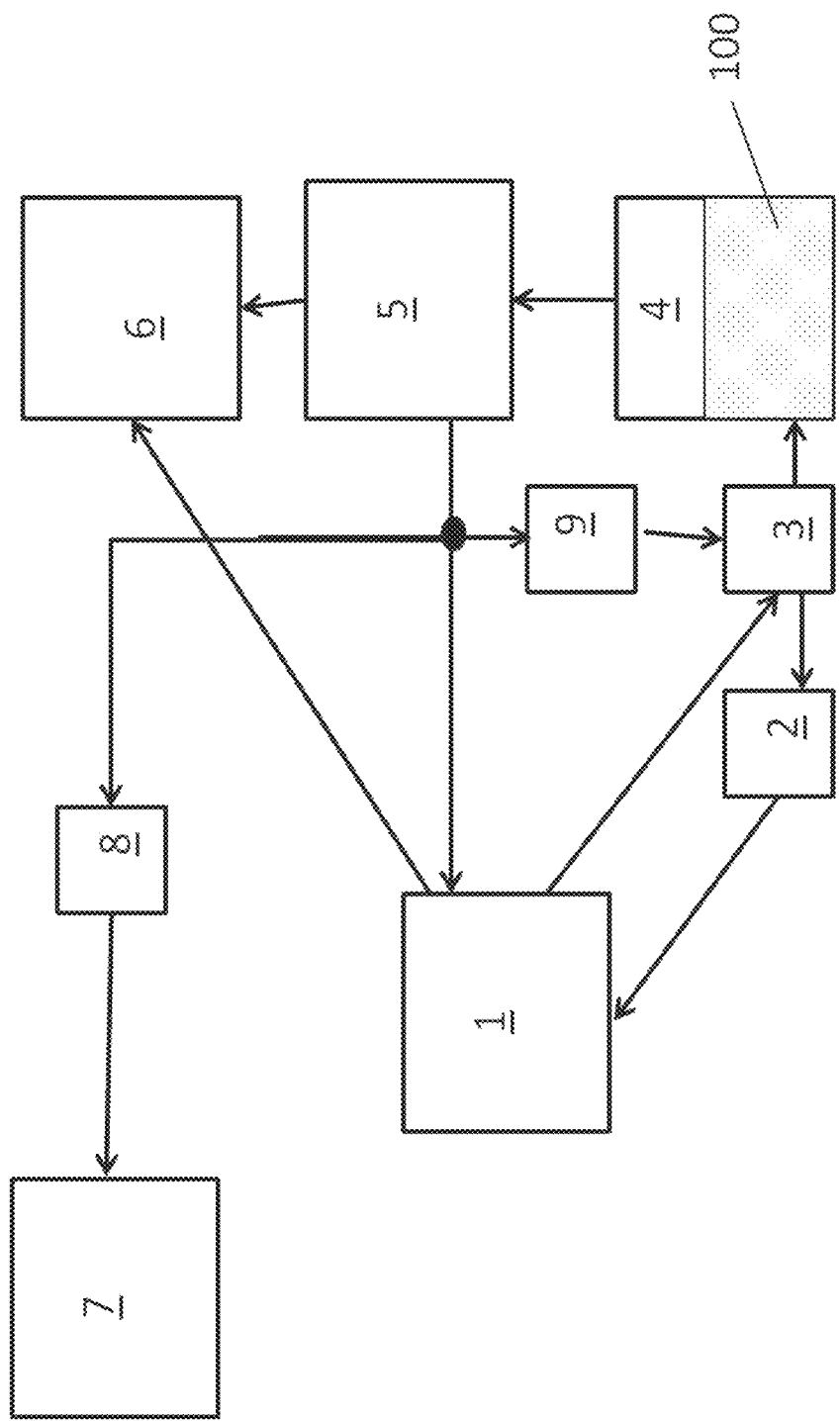
FIG. 2 is a diagram illustrating a fuel cell system according to one embodiment of the present disclosure.
Figure 3:
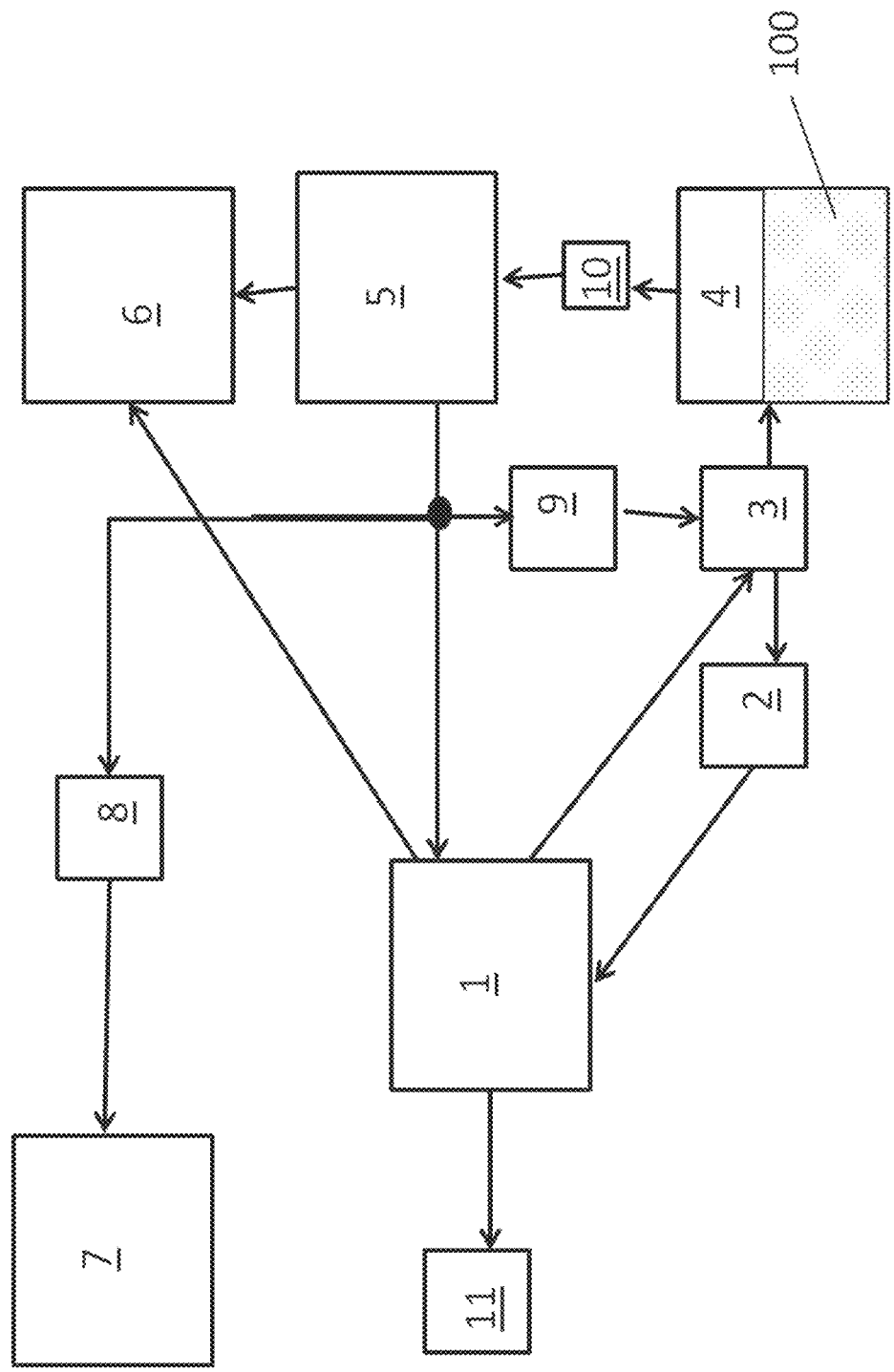
FIG. 3 is a diagram illustrating a fuel cell system according to one embodiment of the present disclosure.

The fuel cell system may further include at least one DC/DC converter 8 or 9 to convert the voltage delivered to the heater and/or the electrical load (electrical device), as shown in FIG. 2.

In addition, a pressure sensor 10 and/or a logging device 11 may be included in the fuel cell system. The pressure sensor 10 is located on one of the hydrogen exit of the canister 4, the hydrogen entrance of the fuel cell 5, or therebetween and may be utilized in concurrence with the temperature profile to provide dynamic feedback for the hydrogen production. The addition of the pressure readings to the feedback loop allows prediction of the set-point temperature (target temperature) utilizing the rate equations or look-up table and adjustments of the set-point based on the feedback from pressure readings. For example, the pressure readings may be utilized as an indication of the difference between the amount of hydrogen produced and the amount of hydrogen used. These values can be compared with the theoretical pressure value based on the expected use and the expected rate of hydrogen release corresponding to the target temperature (determined from the relationship between the rate of hydrogen release and the temperature and composition of the metastable hydrogen carrier). In some instances, the load on the fuel cell may change abruptly, leading to a condition where the consumption of hydrogen is different than what was expected (where rates of production and consumption of hydrogen not matched) and a change in the pressure. When there is a significant discrepancy between the pressure readings and the theoretical pressure value, the controller 1 adjusts the output to the heater by increasing or decreasing the target temperature accordingly.

The logging device 11 allows data to be stored or transmitted to another device for logging. This data can be utilized for iterative learning of the feedback system in order for the system to have a faster and more accurate response, or for diagnostic and recording purposes.

According to an embodiment, a method of operating a fuel cell system includes controlling an electrical power input to a heater utilizing a controller; and heating a metastable hydrogen carrier to a temperature by the heater and to generate hydrogen to feed a fuel cell. The heater is coupled to the controller, and the controller controls the electrical power input to the heater according to a relationship between a rate of hydrogen release and the temperature and a composition of the metastable hydrogen carrier.

Hereinafter, a method of operating the fuel cell system and an operation procedure of the fuel cell system will be described in more detail.

The operation procedure may include one or more of a start-up procedure, a hydrogen generation and management procedure, a temperature control procedure, a fuel cell conditioning procedure and a power management procedure.

Start-up Procedure:

To start the fuel cell system prior to the beginning of generation of hydrogen utilizing the metastable hydrogen carrier (referred to as the primary hydrogen carrier hereinafter), the heater 3 may be powered by an alternative source of energy to heat up the canister 4. Other forms of energy may also be utilized to initiate dehydrogenation (decomposition) such as electromagnetic radiation. A small amount of a catalyst may be added to the primary hydrogen carrier (the hydride) to stimulate hydrogen release at ambient temperature. The heating may be uniform at this start-up stage, or may be non-uniform due to low thermal conductivity of the pristine $AlH_3$. However, the heating may become much more uniform as more of the more thermally conductive free aluminum powder is generated.

The heater may be powered by the electricity generated by the fuel cell. In the start-up stage, alternative hydrogen sources other than the primary hydrogen carrier may be utilized as fuel to the fuel cell. For example, hydrogen may be stored in the volume of the canister 4 not occupied by the primary hydrogen carrier, such as the space between powder particles of hydride, and utilized as the fuel in the start-up stage. Once the primary hydrogen carrier 100 in the canister 4 is heated to an appropriate temperature to start releasing hydrogen at the desired rate, the external energy/hydrogen source is no longer required. The appropriate temperature for $AlH_3$ (also known as alane) may be about 80 to 160° C., and may be as low at 40° C. or as high as 200° C. for other metastable hydrides.

The system then utilizes the hydrogen released from the hydride 100 to generate power from the fuel cell 5. A portion of this power is put back into the heater 3 to continue the reaction in the canister 4. The rest of the power is delivered to the electrical device 7, the controller 1, and/or additional sensors or devices. Here, the DC/DC converters 8 and 9 may be utilized to convert the voltage delivered to one of these components, if desired.

Hydrogen Generation and Management Procedure:

Hydrogen is released from the primary metastable hydride when heated to a suitable temperature, which then enters the fuel cell 5 through connecting tubes or other suitable connectors. A hydrogen buffer may be utilized within the canister 4, within any of the connecting tubes, or be supplied externally. The hydrogen buffer may be utilized to balance the production and demand of hydrogen in the system. The Hydrogen may be buffered by utilizing another hydrogen-containing chemical, additional space within the tubes or canister, or by some other form of hydrogen storage.

A sensor, including but not limited to a pressure or flow rate sensor, may be placed in between the fuel cell 5 and the canister 4 in order to provide an input for a feedback loop to control the release of hydrogen. The fuel cell 5 generates power, which is distributed to other components as described above. A purge unit 6 is utilized with the fuel cell 5 to increase the performance of the fuel cell 5 by removing excess water as well as other contaminants through tubes connecting the fuel cell 5 and the purge unit 6. The purge valve receives power either directly from the fuel cell, or from an external power source.

Temperature Control Procedure:

According to an embodiment, a temperature profile is utilized with a temperature feedback loop to release a constant rate of hydrogen, or any desired hydrogen release profile. This temperature feedback loop receives an input from the temperature sensor 2 and produces an output heater control signal to the heater 3. That is, the temperature from the sensor 2 is received by the controller 1, the controller 1 utilizes this temperature as an input to the feedback loop, the feedback loop then generates an output which controls how much power the heater 3 is to be received.

In one embodiment, a relationship between the rate of hydrogen release from the metastable hydrogen carrier and the temperature and the composition of the metastable hydrogen carrier is determined and utilized in the feedback loop, the composition of the metastable hydrogen carrier is tracked and also as an input to the feedback loop, a target temperature for the metastable hydrogen carrier according to a desired rate of hydrogen release is then calculated and a corresponding power to the heater is then produced as an output of the feedback loop. The desired rate of hydrogen release is determined by the load of the fuel cell. For example, the relationship may be represented by Equation 1 or Equation 2, where the composition refers to the percent of hydrogen released from the metastable hydrogen carrier based on the total amount of hydrogen in the pure (pristine) hydrogen carrier prior to any decomposition reaction.

In another embodiment, a relationship between the rate of hydrogen release, the pressure of the hydrogen, and temperature and composition of the metastable hydrogen carrier are determined and utilized for the determination of the target temperature.

Figure 6:
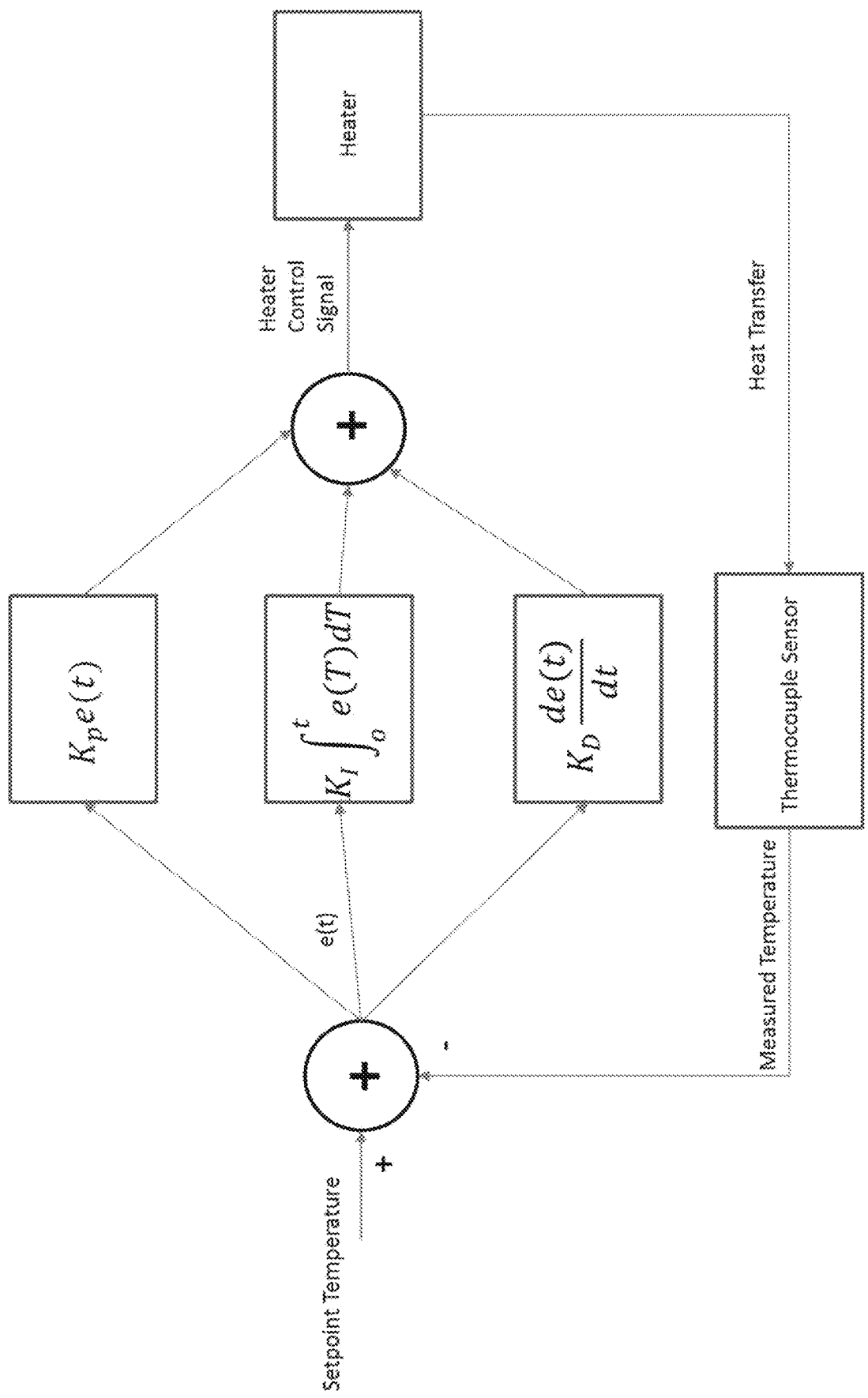
FIG. 6 is a diagram illustrating a temperature feedback loop.

The temperature sensor may be a K-type thermocouple. The thermocouple may be attached directly to the heater 3. However, embodiments of the present disclosure are not limited thereto. The temperature of the metastable hydrogen carrier (e.g., alane) may also be monitored or even utilized for the control. The thermocouple voltage may be connected to an amplification circuit, which linearizes temperature as a function of voltage. The controller reads this voltage periodically utilizing an analog to digital converter, and uses a linear equation to determine the temperature. The temperature is the input into a Proportional Integral Derivative (PID) feedback loop with a duty cycle (or a target temperature profile) as an output to the heater. Duty cycle may also be controlled by parameters measured utilizing other sensors, such as pressure, flow rate, etc. This duty cycle, through Pulse Width Modulation (PWM), drives a switching MOSFET, which controls how much power the heater 3 receives. FIG. 6 is a diagram illustrating a temperature feedback loop according to an embodiment of the present disclosure. Referring to FIG. 6, the measured temperature values from the thermocouple sensor as an input to the controller is compared with the desired temperature (the setpoint temperature), the PID feedback loop calculates the proportional, integral and derivative gains Kp, Ki, and Kd respectively, based on the error e(t) (difference between the desired temperature value and the actual temperature value from the thermocouple sensor) as a function of time (t) and temperature (T), and sends a heater control signal to adjust the temperature to the desired value.

Fuel Cell Conditioning:

The controller 1 conditions the fuel cell 5 by purging the fuel cell with an initial predetermined duration and period through a purge control signal. This purge control signal may be a logic signal to a MOSFET, which controls the power to the purge valve. The purge valve opens if power is supplied and closes otherwise. The purge duration and period are dynamically optimized based on fuel cell performance characteristics, such as the fuel cell voltage, current, and previous power production history (e.g., Ah throughput) of the fuel cell. This allows for a dynamic purge, which is directly related to the current state of the fuel cell.

Power Management Procedure:

Current and Voltage sensors, or other sensors indicative of power distribution, may be added to the power output of the fuel cell as well as to the heater and load respectively. By measuring the current and voltage output of the fuel cell, as well as the power demand, the fuel cell system may dynamically allocate power to different electrical components. For example, during high power demand, the controller 1 may limit the duty cycle signal of the heater 3 in order to limit the power that the heater 3 consumes. This allows the system to temporarily allocate more power to other components. If an electrical device demands more power than the system can supply in a stable manner, the controlling algorithm can shut off that electrical device, or shut off other devices connected to the fuel cell power output in order to reduce or prevent damage to the fuel cell 5. A hydrogen buffer or alternative power source may also be added to smooth load balancing.

Example 1—Weight Percent Hydrogen

In this example, the canister is a cylinder made of aluminum (density of 2.7 g/cm$^3$) with a cylinder height to diameter ratio of 3.5 and a wall thickness of 0.020 inches. It is filled with aluminum hydride (theoretical density of 1.5 g/cm$^3$) in powder form with a powder packing fraction of 50%. An integrated heater is utilized with a heater length of 3.9 cm of heater per gram of aluminum hydride powder. With 10 kJ/mol AlH$_3$ required to release hydrogen from the metastable hydride, a theoretical minimum Watts/g AlH$_3$ can be calculated from the decomposition time (molar mass of AlH$_3$ being approximately 30.0 g/mol). To release 1 wt %/hr of hydrogen (decomposition time 10 hours with 10 wt % hydrogen/AlH$_3$), 0.0093 Watts/g AlH$_3$ is required to sustain the release rate. For 40 wt %/hr (a 15 minute release window), a minimum of 0.370 Watts/g AlH$_3$ is required to sustain the hydrogen release rate. To account for the heat dissipation to the ambient, and the energy required to heat the metastable hydride to the starting temperature from room temperature, the power needed was multiplied by a factor of 2.5. The power needed above the theoretical minimum depends on heater design as well as geometry and material of the canister.

Figure 4:
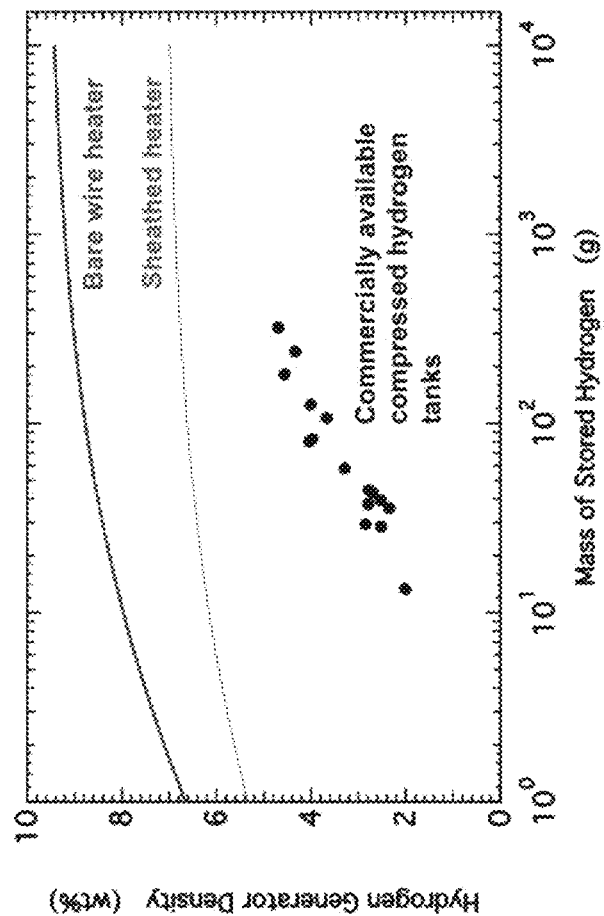
FIG. 4 is a plot showing the hydrogen generator density versus mass of stored hydrogen.

Two options of the heater were utilized. The first option is a sheathed cable heater which has a weight of 0.1 g/cm of heater length. The second option is a bare wire heater which has an estimated weight of 0.01 g/cm of heater length. The gravimetric hydrogen density (i.e., the weight percent hydrogen) of the hydrogen generator was calculated as a function of the mass of stored hydrogen for both heater options and shown in FIG. 4. For the sheathed heater (in which the heater wire is encased in a metal tube (sheath) that is electrically isolated from the heater wire thus preventing the heater from being shorted during use) option the gravimetric density is greater than 5 wt % for small amounts (about 1 gram) of stored hydrogen. The density increases to about 7 wt % for about greater than 1000 grams of stored hydrogen. For a bare wire heater, the density is greater than 6 wt % for about 1 gram of stored hydrogen increasing to greater than 9 wt % for about greater than 1000 grams of stored hydrogen. For comparison, also shown in FIG. 4, are the gravimetric hydrogen densities for commercially available compressed hydrogen tanks. These tanks at best contain about 5 wt % hydrogen. Further they show a strong dependence with the mass of stored hydrogen, decreasing to about 2 wt % for about 10 grams of stored hydrogen.

Example 2—Temperature Profile

The temperature control was tested in a system utilizing a cartridge (a canister) filled with alumina (as a substitute for the metastable hydride). Utilizing a fuel cell with a hydrogen tank to supply power to the heater through a step-up converter, the microcontroller controlled the temperature of the cartridge utilizing a pre-programmed temperature profile. A K-type thermocouple was placed directly on the heater and was utilized as the input for the temperature feedback loop. A second thermocouple was placed in the middle of the canister in order to measure the difference in temperature between the middle of the canister and the heater. The pre-programmed temperature profile (temperature as a function of time) was calculated so that hydrogen would be released from the metastable hydride at 30 weight percent per hour for 15 minutes. To heat up the cartridge, a cable heater was bent into a single helix shape, which distributed heat evenly through the canister. Because the initial temperature (i.e., the initial temperature of the temperature profile) was higher than room temperature, two temperature ramps were utilized to increase the temperature of the cartridge to the starting hydrogen release temperature (around t=1500 secs) in an effort to reduce or minimize the amount of hydrogen prematurely released from the metastable hydride. Since the composition of the metastable hydride would not release a large amount of hydrogen at 100° C., the first ramp was from room temperature to 100° C. The second ramp was from 100° C. to about 175° C.

Figure 5:
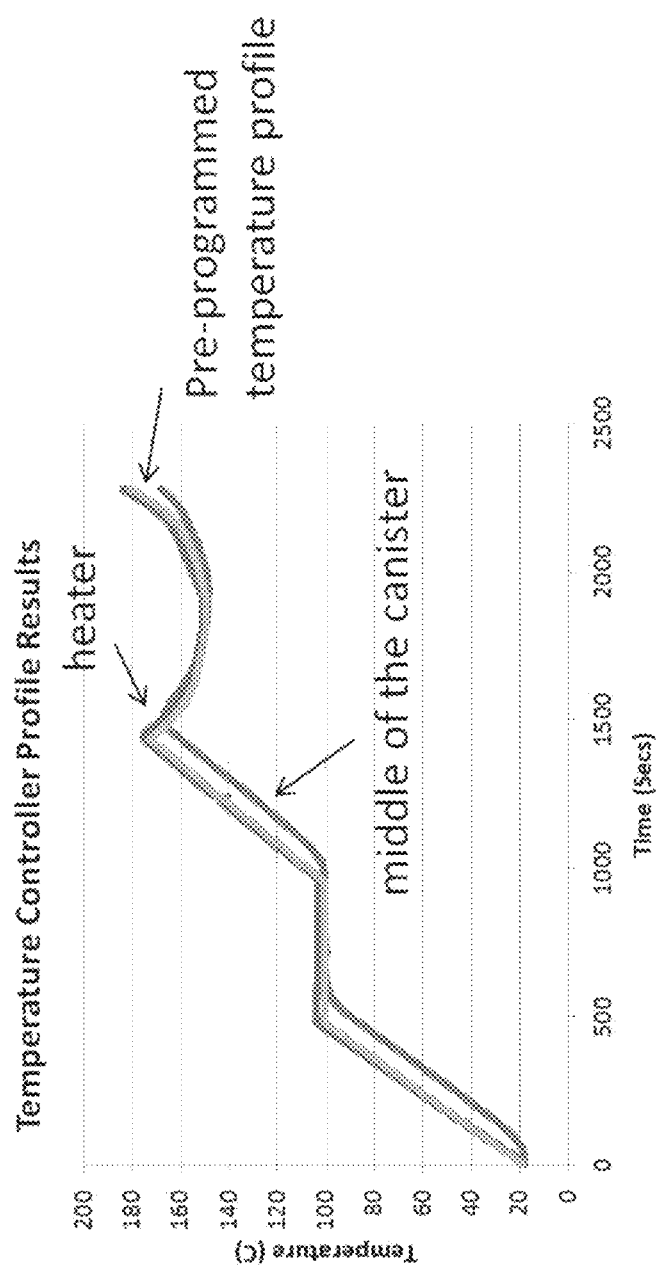
FIG. 5 is a plot showing the pre-programmed temperature profile, the temperature of the heater and the temperature at the middle of the canister.

FIG. 5 is a plot showing the pre-programmed temperature profile, the temperature of the heater and the temperature at the middle of the canister. Because alumina is an insulator, there was a noticeable lag time and temperature gradient between the middle of the canister and the heater. In order to supply more power to the load, the power supplied to the heater was limited (e.g., reduced) after t=1500 seconds by limiting the maximum duty cycle sent to the heater. The duty cycle is directly proportional to the amount of power supplied to the heater, so a smaller duty cycle results in less power utilized. As can be observed from FIG. 5, the temperature of the heater is controlled very precisely to match the pre-programmed temperature profile.

A fuel cell system according to embodiments of the present disclosure can control the release of hydrogen as a function of temperature and composition to achieve a controlled release of hydrogen from a metastable hydride. It is compact and lightweight and suitable for various devices such as small vehicles. Furthermore, power from the fuel cell is adequate to run the device, although external power can be supplied for load balancing.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A method of operating a fuel cell system, the method comprising:

determining a temperature according to a rate of hydrogen release and a composition of a metastable hydrogen carrier utilizing a controller;

controlling an electrical power input to a heater utilizing the controller; and heating the metastable hydrogen carrier to the temperature by the heater and to generate hydrogen to feed a fuel cell;

the heater being coupled to the controller, and the controller controlling the electrical power input to the heater according to a relationship between the rate of hydrogen release and the temperature and the composition of the metastable hydrogen carrier, wherein the temperature is determined in accordance with a current percentage of hydrogen released from the metastable hydrogen carrier and the rate of hydrogen release according to:

$$T = \left[ -\frac{R}{E_a} \ln \left( \frac{r}{r_{00} + \frac{A_0}{(x - x_0)^2 + B}} \right) \right]^{-1},$$

and wherein r represents the rate of hydrogen release, T represents the temperature, R is the gas constant, $E_a$ represents activation energy in unit of KJ/mol, $r_{00}$ and $A_0$ each represent a pre-exponential constant, B represents a temperature independent constant, $x_0$ is an initial percentage of hydrogen released from the metastable hydrogen carrier and x is the current percentage of hydrogen released from the metastable hydrogen carrier.

2. The method of claim 1, wherein the relationship between the rate of hydrogen release and the temperature and the composition of the metastable hydrogen carrier is determined by an equation, the equation including one or more constants independent of temperature and one or more parameters dependent on temperature.

3. The method of claim 2, wherein the relationship further includes a pressure of the generated hydrogen.

4. The method of claim 1, wherein the relationship between the rate of hydrogen release and the temperature and the composition of the metastable hydrogen carrier is determined by a look-up table.

* * * * *